United States Patent [19]

Kamena

[11] Patent Number: 4,742,456
[45] Date of Patent: May 3, 1988

[54] SOUND RESPONSIVE TUBE CONTROL CIRCUIT

[75] Inventor: David H. Kamena, Parsippany, N.J.

[73] Assignee: American Standard Inc., New York, N.Y.

[21] Appl. No.: 476,654

[22] Filed: Mar. 18, 1983

[51] Int. Cl.[4] ............... G06F 15/46; A61H 33/02; H03G 3/20
[52] U.S. Cl. .................. 364/400; 4/542; 340/310 A; 364/138; 367/198; 381/110
[58] Field of Search ............ 364/400, 138, 139, 509, 364/510; 381/86, 110; 340/148, 310 R, 310 A; 367/198; 128/369, 370; 4/191, 524, 542–545, 538, 546, 559, 597, 604, 661

[56] References Cited

U.S. PATENT DOCUMENTS

| 3,836,959 | 9/1974 | Pao et al. | 367/198 X |
| 3,972,603 | 8/1976 | Lubinec | 367/198 |
| 4,162,486 | 7/1979 | Wyler | 340/310 A |
| 4,169,293 | 10/1979 | Weaver | 4/178 |
| 4,174,517 | 11/1979 | Mandel | 340/310 A |
| 4,237,562 | 12/1980 | Du Pont | 4/543 |
| 4,275,266 | 6/1981 | Lasar | 367/198 X |
| 4,322,031 | 3/1982 | Gehlert | 236/12 R |
| 4,353,502 | 10/1982 | Myers | 236/47 |
| 4,398,789 | 8/1983 | Pryor | 350/96.2 X |
| 4,420,811 | 12/1983 | Tarnay et al. | 364/510 |

FOREIGN PATENT DOCUMENTS 2939687 9/1979 Fed. Rep. of Germany.
2940269 10/1979 Fed. Rep. of Germany.

OTHER PUBLICATIONS

Sound Operated Switch, Tooley et al., Practical Electronics, 5/79, vol. 15, #5.

Primary Examiner—Joseph Ruggiero
Attorney, Agent, or Firm—Robert G. Crooks; James J. Salerno, Jr.; John P. Sinnott

[57] ABSTRACT

An illustrative embodiment of the invention provides a microprocessor for deenergizing the air and water pumps for a whirlpool bath when a voice communication system is activated from the bath to reduce background noise. A stereophonic sound system also can be incorporated into the bath tub control circuit in the same manner. A carrier current control also responds to the microprocessor by sending control signals through the household electrical wiring circuit to regulate, from the bath tub, other functions, of which heat lamp, room illumination and door unlocking are typical.

10 Claims, 2 Drawing Sheets

SOUND RESPONSIVE TUBE CONTROL CIRCUIT

BACKGROUND OF THE INVENTION

1. Field of the Invention

This invention relates to control circuits for bathing apparatus and more particularly, to an electrical circuit for controlling bath water temperature and the degree of bath water agitation, and the like.

2. Prior Art

The physical benefits of "whirlpool" and "hot tub" baths are well known. Tubs or baths of this nature generally provide some degree of bath water temperature monitoring or regulation, and "whirlpool" features of which the introduction of massaging jets of water and air into the bath water are typical. Frequently, features of this character can be "programmed" in order, for example, to establish a desired tub water temperature at a particular time and to continue "whirlpool" operation for a predetermined interval. There is, nevertheless, an unsatisfiied need for a more comprehensive bath control that would enable the bather to enjoy a considerably longer and uninterrupted bath and to control from the bath tub a number of household activities that otherwise would impose an irritating interruption to the bath.

BRIEF DESCRIPTION OF THE INVENTION

These additional control features now are possible through the application of microprocessor technology to bath control apparatus. Illustratively, a microprocessor is provided to initiate the introduction of air and water jets to the bath water and, at a predetermined time, to terminate these jets, as well as to maintain the bath water temperature at a level that is compatible with comfort and safety.

The microprocessor further controls on either a program or on a command basis, filling the tub with water and draining waste water from the tub at the conclusion of the bath. The microprocessor also is coupled to the telephone system to enable the bather to dial telephone numbers, receive incoming telephone calls and to conduct these telephone conversations through a loud-speaker system. Desired levels of illumination, within the bath area and in the bath water, also are controllable through the microprocessor, as well as to control the generation of stereophonic music within the bathing area. A capability to converse with visitors through a primary door intercommunication system and a door release mechanism for the primary and bathroom doors also is provided as a feature of this system. The circuit under consideration also deactivates pump and stereophonic sound systems if the telephone or intercommunication system are in use.

Many of the command signals of which the primary and bathroom door release mechanism are typical, are carried through the household electrical wiring system through a carrier current control. The microprocessor moreover, is coupled to the telephone system. In this way, a potential bather may communicate directly with the microprocessor through the telephone system in order to have the bath prepared in the desired manner upon arrival in the bathing area. these and other features of the invention are obtainable in a relatively, inexpensive reliable and safe-to-use apparatus.

DETAILED DESCRIPTION OF THE PREFERRED EMBODIMENT

Figure 1:
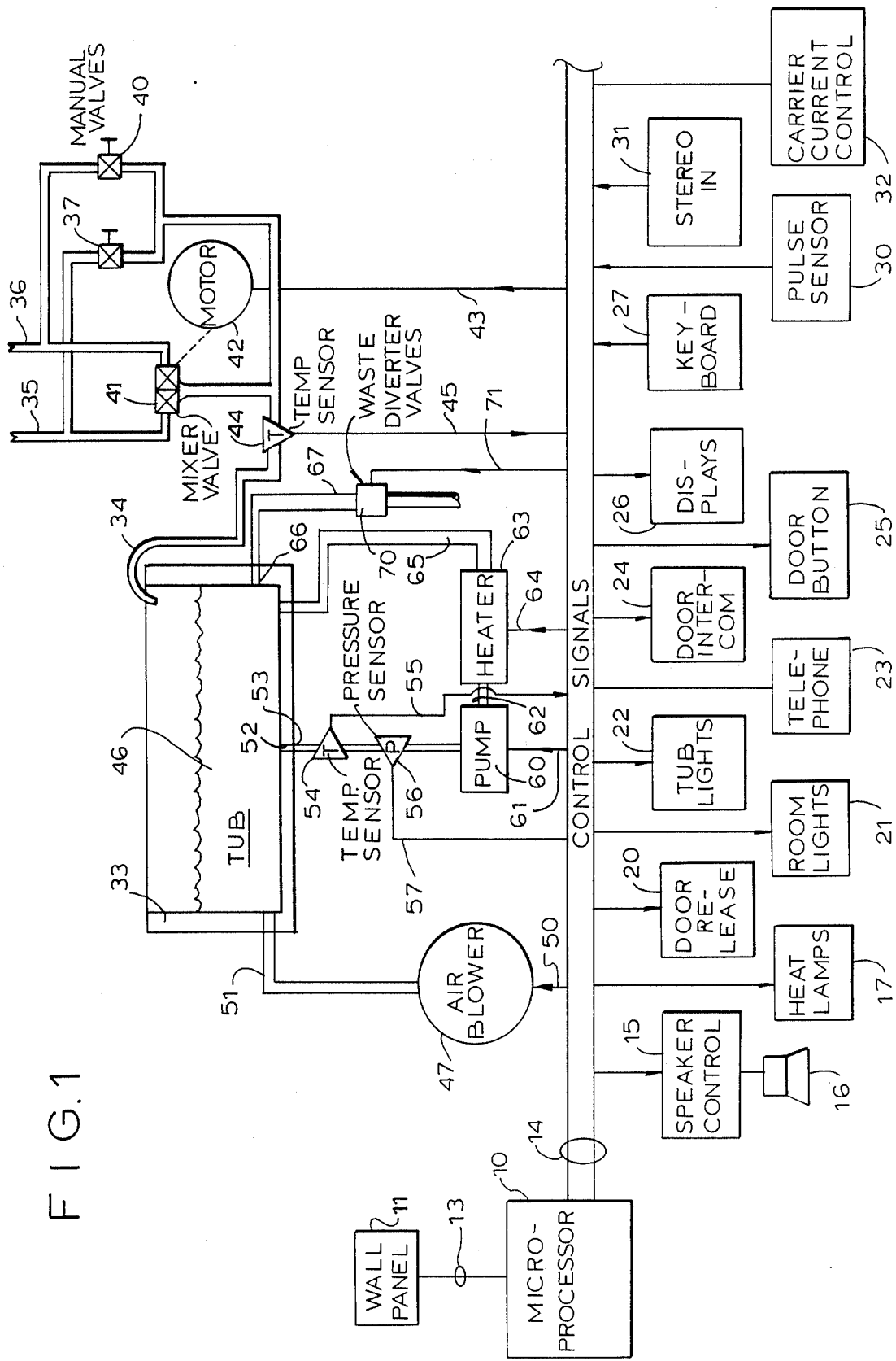
FIG. 1 is a schematic diagram of a typical embodiment of the invention.

For a more complete appreciation of the invention, attention is invited to FIG. 1 which shows a microprocessor 10, of which the Motorola No. 6802 microprocessor is typical, controlled through manipulation of individual switches (FIG. 2) in a wall panel 11.

Figure 2:
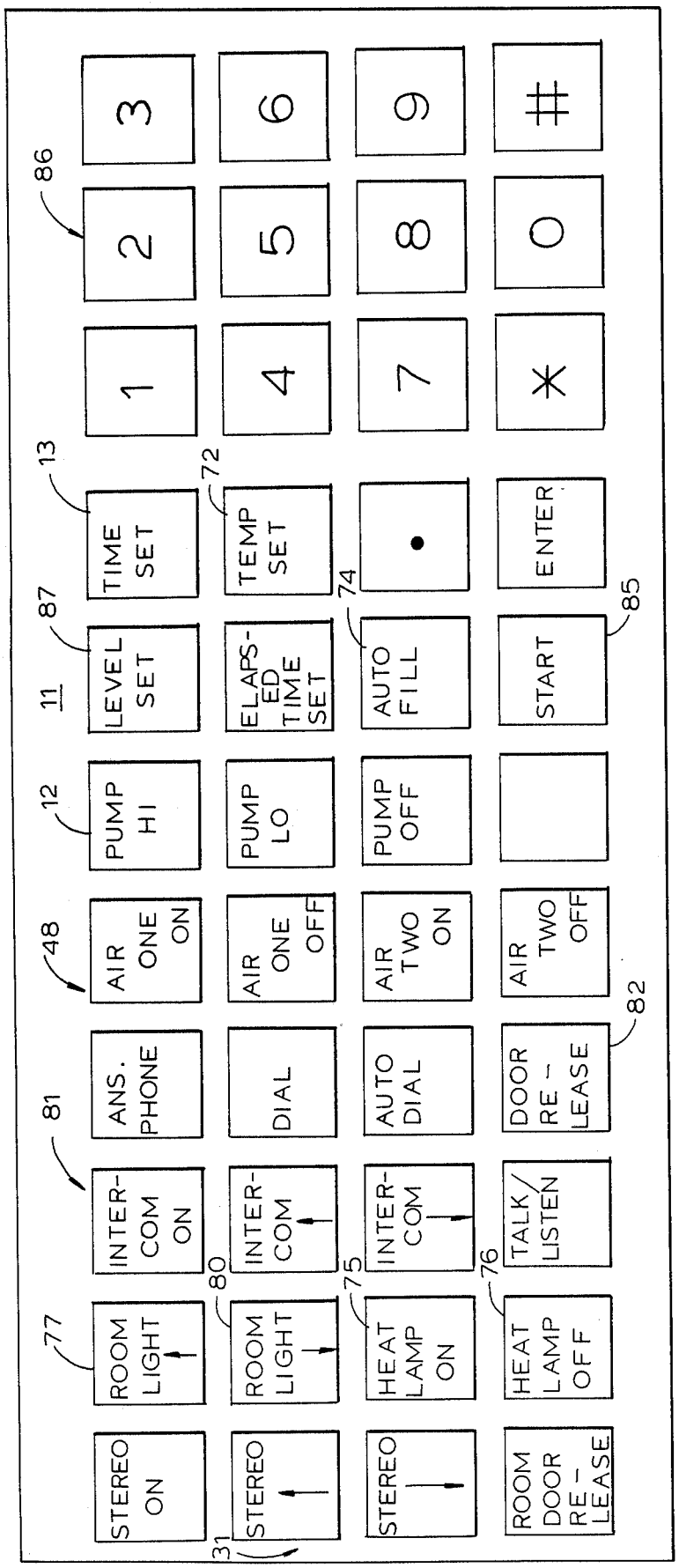
FIG. 2 is a wall panel keyboard suitable for use in connection with the embodiment of the invention shown in FIG. 1.

As shown in the drawing, the wall panel 11 preferably is a waterproof membrane type switching device of the sort described in more complete detail in *Topflight Corporation Brochure* titled "Membrane Switching Panels and Keyboards". Thus, as shown in FIG. 2, discrete areas on the surface of the waterproof, flexible membrane identify associated pressure switches on the opposite side of the membrane. Signals from these switches, when activated or deactivated, as for example, high speed pump switch 12, are sent through a cable 13 (FIG. 1) to the microprocessor 10. The microprocessor 10, in turn, gates signals that correspond to desired functions through another cable 14 for subsequent activation of the appropriate bath-associated function. Accordingly, the cable 14 is coupled electrically to an audible speaker control 15 and speaker 16. Signals in the cable 14 also are transmitted to the heat lamps 17, door release 20, room lights 21, underwater tub lights 22 (preferably flexible fiber optic light transmission apparatus of the sort available from Xanadu International, Inc., 6859 Valjean Av., and Van Nuys, Calif. 91406), telephone 23, primary door intercommunication 24, primary door lock release 25, visual tub status displays 26, auxiliary keyboard 27, a pulse sensor 30, a stereophonic signal input 31 and a carrier current control 32.

As shown schematically in FIG. 1, a bath tub 33 is provided with a water inlet 34 that is in fluid communication with hot and cold water conduits 35, 36, respectively, by way of parallel branches through manually operated hot and cold water valves 37, 40, in one branch, and through a mixer valve 41 in the other branch. As shown, the mixer valve 41 is automatically controlled through the microprocessor 10, by means of signals that are sent by way of the cable 14 and a conductor 43 to a motor 42. The motor 42, moreover, is mechaniclaly connected to the mixer valve 41 in order to adjust the relative hot and cold water proportions as described subsequently. Mixing control signals that regulate the hot/cold mixture are received from a temperature sensor 44. Typically, the temperature sensor 44 is in thermal communication with the water flowing through the inlet 34 and sends signals that correspond to this water temperature through a conductor 45 to the cable 14 for transmission to the microprocessor 10 . The microprocessor 10, in turn, responds to these temperature signals by controlling the operation of motor 42 to adjust the movement of the mixer valve 41 that regulates the relative inlet flows of hot and cold water to the tub 33 by way of the inlet 34.

It will be recalled that the tub 33, in this illustrative embodiment of the invention, has been provided with "whirlpool" tub features in which jets of water and, if desired, air either individually or mixed with the jets of water, are introduced into bath water 46 for massage and therapeutic purposes. Thus, air blower 47 responds to signals in a conductor 50 by pumping air under pressure through a conduit 51 into the water 46 in the tub 33. Note i n he embodiment of the invention under consideration that only one conduit 51 is shown in communication with the bath water 46. Preferably, however, several pressurized air discharges are arrayed in the tub 33 in general alignment with that portion of the tub that ordinarily supports the bather's back in order to present a soothing and relaxing physical effect. Naturally, other air and water jet arrangements can be disposed within the tub, as desired.

Thus, a water intake 52 is in fluid communication with the bath water 46 in the tub 33. The intake 52 communicates with a water conduit 53. Within the conduit 53 a water temperature sensor 54 responds to the temperature of the water within the conduit by sending a signal through a conductor 55 to the cable 14 for transmission to the microporcessor 10. A water pressure sensor 56 also responds to the hydraulic pressure within the conduit 53 and sends a signal that reflects this pressure through a conductor 57 to the cable 14, also for transmission to the microprocessor 10. The conduit 53 terminates at the inlet to an electrically driven wate pump 60. The pump 60 is energized and deactivated, as desired, through control signals that are sent to the pump from the microprocessor 10 by way of a conductor 61.

Bath water under pressure is discharged from the pump 60, when this pump is activated, through a discharge conduit 62 that is in fluid communication with a water heater 63. As illustrated, the water heater 63 is activated and energized through a conductor 64 from the cable 14 that is connected to the microprocessor 10. Water is discharged from the heater 63 through a jet conduit 65 into the bath water 46 within the tub 33. Although only individual air jets 51 and water jets 65 are shown in the drawing, a diverter valve (not shown) also can be provided to direct the air under pressure into the tub 33 through many small perforations rather than through the jets 51, as shown.

A waste bath water drain 66 permits water to flow from the tub 33 through a waste conduit 67 that is selectively opened and closed by means of electrically activated waste valve 70 that interrupts or permits flow through the conduit 67 in response to signals in a conductor 71 from the cable 14 and the microprocessor 10.

In operation, as shown in FIG. 2, an appropriate switch, e.g., the high speed pump switch 12 is activated. The activation signal from the pump switch 12 is sent through the cable 13 to the micrprocessor 10. Within the microprocessor 10, appropriate circuits send signals from the cable 14 and the conductor 61 to the pump 60. A portion of the bath water 46 in the tub 33 is drawn through the intake 52 and enters the conduit 53. The temperature of the water thus flowing through the conduit 53 is registered by the temperature sensor 54 that sends an appropriate signal from the conductor 55 to the microprocessor 10. The microprocessor 10 compares the measured water temperature signal with the temperature that was set through manipulation of temperature set switch 72 (FIG. 2). If the measured temperature is less than a desired predetermined bath water temperature, the microprocessor 10 activates the heater 64 in order to warm the water flowing from the pump 60 back into the tub 33 through the jet conduit 65. The pressure sensor 56 in the conduit 53 responds to the observed pressure in that conduit by sending a signal to the microprocessor 10. If the response of the pressure sensor 56 registered in the microprocessor 10 is indicative of low water or no water within the tub 33, the microprocessor deenergizes the pump 60. A low water signal also is sent to the display 26 for visual presentation. The pump 60, moreover, is coupled to the telephone 23 and the intercommunication circuit 24 through the cable 14 and the microprocessor 10 in a manner that permits the microprocessor to deactivate the pump 60 when either of the voice circuits are in operation, to eliminate background pump noise.

Assuming, however, that the depth of the bath water 46 is adequate to protect the pump 60, or the voice circuits are inactive, the pump continues to run and to discharge a jet of water at high or low pressure, as desired. At the conclusion of the bath, or at some time set through manipulation of a time setting switch 73 (FIG. 2), the pump 60, the heater 63 and the air blower 47 all are deenergized through appropriate signals transmitted from the microprocessor 10. At the same time, the microprocessor 10 enables the waste diverter valve 70 to open and thereby to permit the waste bath water 46 to flow from the tub 33 through the waste conduit 67 and into the conventional sewage system.

To initiate a complete bathing cycle, automatic fill switch 74 (FIG. 2) is manipulated to enable the microprocessor 10 (FIG. 1) to energize the waste valve 70 and close the waste water drain 66. At the same time the motor 42 is activated to open the mixer valve 41 in the hot and cold water conduits 35, 36. The mixer valve 41 is controlled through the motor 42 to permit water to flow from the water inlet 34 into the tub 33. The temperature sensor 44 responds to the temperature of the water flowing through the inlet 34 to send a signal by way of the conductor 45 to the microprocessor 10. The microprocessor 10 compares this measured water temperature with the temperature selected by the bather through manipulating the temperature set switch 72 (FIG. 2). An error signal that is generated through this comparison is applied to the motor 42 to cause the motor to adjust the hot and cold water mixing proportions produced at the mixer valve 41 in order to bring the water flowing through the inlet to the desired level. At the end of a predetermined filling time, or in response to depth of the water in the tub 33 are registered through the pressure sensor 56, the microprocessor 10 sends a control signal to the motor 42 that closes the mixer valve and terminates further filling of the tub 33 during the bathing cycle.

An additional feature, the manual hot and cold water valves 37, 40, also are provided to bypass the conduits that are connected in parallel with the mixer valve 41. This feature of the invention provides manual control of the tub filling portion of the bath cycle.

In accordance with additional features of the invention, the membrane switch shown in FIG. 2 can be manipulated to provide a number of associated functions directly from the tub 33 through manipulation of appropriate switches on the tub-mounted auxiliary keyboard 27. The keyboard 27 present an array of switches that is similar, or the same, in layout to that which is shown in FIG. 2 with respect to the wall panel 11. Thus, as shown in FIG. 2, the group of switches 31, 81, control the operation of the stereophonic sound telephone and intercom systems, as well as deactivation through the microprocessor 10 (FIG. 1) of the water pump 60 and the air blower 47. In accordance with the invention if, for example, the telephone or intercom circuits are activated to permit voice communication, signals are sent from, say the telephone 23 or the intercom 24 through the cable 14 to the microprocessor 10 to indicate an active status for one of the voice systems. The microprocessor 10 responds to this signal by deenergizing (or reenergizing at the end of the conversation) the stereophonic system 31, the air blower 47 and the water pump 61, as each of these devices may have been operating, in order to eliminate background noise that might interfere with conversation through the telephone or intercom systems and to restore these devices to operate at the end of the conversation.

The heat lamps 17 are controlled through switches 75 and 76, respectively, and the room lights 21 are dimmed or brightened, as desired, through the operation of room light switches 77 and 80.

The primary door control (to unlock the door) is activated through manipulation of door release switch 82 which causes the microprocessor to transmit an appropriate door unlock command signal from the carrier current control 32 to the door (not shown) through the household wiring system (also not shown). The door is unlocked, however, only on command from the microprocessor 10 when the door intercom 24 is also activated. Further in this respect, the carrier current control 32, also on appropriate command from the microprocessor sends signals through the household electrical wiring system to regulate the heat lamps 17, the room lights 21 and the like. Other pertinent data, of which water temperature and elapsed time since commencement of the bathng cycle are illustrative, are sent from respective signal sources through the microprocessor 10 to the raster on the display 26.

The level of the bath water 46 within the tub 33 is predetermined through operation of a water level switch 87. By activating the switch 87 and manipulating the appropriate numerical switches 86, the desired tub water level is established. As previously mentioned, the pressure sensor 56 responds to the head of the bath water 46 in the tub 33 by sending a signal through the conductor 57 that prevents the pump 60 and the air blower 47 from operating as long as the water level in the tub is too low. As the tub 33 fills to a level that will permit the blower 47 and the water pump 60 to operate, such operation (if programmed into the microprocessor 10) will commence for the preestablished time. As the desired depth of the bath water 46 is reached, the microprocessor 10 responds to the signal from the pressure sensor 56 by sending a signal through the conductor 43 to the motor 42 that causes the motor to terminate flow through the mixer valve 41. The level of aeration activity within the tub 33 also is established through suitable operation of a group of air blower switches 84. There is, of course, a further switch 85 for energizing the entire system prior to initiation of any of the functions mentioned above. A conventional telephone "push button" type numerical array 86 mentioned above also is provided on the wall panel 11.

It is through the operation of the numerical switches 86 that tub operation, bath water temperature, telephone dialling, the stereophonic selection and other important functions mentioned herein can be chosen, activated and automatically or manually deactivated as willed. Thus there is provided in accordance with the invention the microprocessor 10 that enables the bather to accomplish from the tub 33 a number of otherwise burdensome tasks that would require a bather to leave the tub in most circumstances while, moreover, providing a bather with invigorating massage at comfortable and safe bath water temperatures.

I claim:

1. A bath tub control circuit for a bath tub to hold bath water comprising, a bath water pump for regulating water within the bath tub, a microprocessor coupled to said bath water pump for energizing and deenergizing said pump, a voice communication circuit coupled to said microprocessor and operable at least from the bath tub for selective activation therefrom and for deenergizing said bath water pump through said microprocessor as said voice communication circuit is activated.

2. A control circuit according to claim 1 further comprising, an air blower in fluid communication with the bath tub, said air blower being controlled by said microprocessor to deenergize as said voice communication circuit is activated.

3. A control circuit according to claim 2 further comprising, a stereophonic sound circuit operable at least from the bath tub for selective activation therefrom and coupled to said microprocessor for deactivation as said voice communication circuit is activated.

4. A control circuit according to claim 3 wherein said voice communication circuit further comprises a telephone coupled to said microprocessor.

5. A control circuit according to claim 4 wherein said voice communication circuit further comprises an intercommunications circuit associated with said door and the tub.

6. A control circuit for a bath tub in a building having an electrical wiring circuit comprising, a bath water pressure sensor, a bath water pump in fluid communication with said pressure sensor, a microprocessor coupled to said pressure sensor and said bath water pump for energizing and deenergizing said pump, a voice communication circuit coupled to said microprocessor and operable at least from the bath tub for selective activation therefrom and for deenergizing said bath water pump through said microprocessor as said voice communication circuit is activated, and a carrier current control circuit coupled to the building electrical wiring circuit and to said microprocessor for sending control signals through said building electrical wiring circuit in response to command signals from said microprocessor.

7. A control circuit according to claim 6 further comprising, a door, a lock associated with said door, and a control circuit for selectively unlocking said door in response to control signals from said current control circuit.

8. A control circuit according to claim 7 wherein said microprocessor sends command signals to said carrier current control circuit only if said voice communication circuit is activated.

9. A control circuit according to claim 6 further comprising, an heat lamp coupled to the building electrical wiring circuit for selective activation in response to control signals from said carrier current control circuit.

10. A control circuit according to claim 6 further comprising, a room light coupled to said building electrical wiring circuit to establish selected levels of illumination in response to control siganls from said current control circuit.

* * * * *

UNITED STATES PATENT AND TRADEMARK OFFICE
CERTIFICATE OF CORRECTION

PATENT NO. : 4,742,456

DATED : May 3, 1988

INVENTOR(S) : David H. Kamena

It is certified that error appears in the above-identified patent and that said Letters Patent is hereby corrected as shown below:

In the Title:

Delete "Tube" and substitute -- Tub --.

Column 1, line 22, "unsatisfiied" should read -- unsatisfied --.

Signed and Sealed this

Thirteenth Day of September, 1988

Attest:

DONALD J. QUIGG

*Attesting Officer*          *Commissioner of Patents and Trademarks*